Feb. 13, 1962 J. P. HAMMER ET AL 3,021,059

DETECTION CIRCUIT FOR UNWANTED DESIGNATIONS AND BLANK COLUMNS

Filed June 10, 1957

INVENTORS
JAMES P. HAMMER
JAY W. SLATER

BY [signature]

AGENT

United States Patent Office 3,021,059

Patented Feb. 13, 1962

3,021,059

DETECTION CIRCUIT FOR UNWANTED DESIGNATIONS AND BLANK COLUMNS

James P. Hammer, Endwell, and Jay W. Slater, Endicott, N.Y., assignors to International Business Machines Corporation, New York, N.Y., a corporation of New York Filed June 10, 1957, Ser. No. 664,586
3 Claims. (Cl. 235—61.11)

This invention relates broadly to checking circuits and more specifically to a circuit arrangement for detecting blanks and unwanted data designations in data bearing columns or regions of a record, tape, or the like.

The invention resides in the use of a three-stage open-ended ring for detecting the status of a record as to the presence or absence of columnar designations therein in combination with an inexpensive circuit arrangement including diodes for manifesting or detecting the status as to blanks or double designations depending upon whether the first or last stage of the ring is on at the end of a cycle of operation, the second stage when on indicating the presence of a valid, or single, designation in the column being analyzed.

Although the invention is illustrated in connection with a particular machine controlled by punched records, it may be appreciated that the invention may be utilized in other types of data processing machines processing record media in which the data is manifested in other forms, for example, conductive marks, discrete magnetized spots, photosensitive marks, etc., depending upon the nature of the data sensing mechanisms.

The main object resides in a novel blank column and double designation detection circuit which employs inexpensive circuit components having wide tolerance values in an unique arrangement which enables reliable and high speed operations.

Other objects of the invention will be pointed out in the following description and claims and illustrated in the accompanying drawings, which disclose, by way of examples, the principle of the invention and the best mode, which has been contemplated, of applying that principle.

The invention is incorporated in a machine of the type shown and described in the Patent 2,053,067 issued to J. M. Cunningham on September 1, 1936. This machine is commonly referred to as a reproducing punch and is adapted with two record feeding units, namely, a read unit and a punch unit. Perforated records are normally placed in the reading unit while blank cards are generally placed in the punch unit. In the normal course of operation of the reproducing punch, the data read from the records passing through the read unit are punched into the blank records passing through the punch unit. For the purpose of illustrating an application of the invention, the punch unit will be considered but only in a somewhat schematic manner. The records 1 passing therethrough are fed twelve edge, 1*a*, first, so that the index point data representing positions on the records will correspond to the cycle point timing of the machine. The basic timing cycle of the machine is shown in the timing chart of FIG. 2 of the drawings. At the top of this timing chart it will be seen that the machine cycle is comprised of fourteen points, beginning with point 14, followed by the card index point positions 12–11–0–1 through 9, and point 13.

Figure 1:
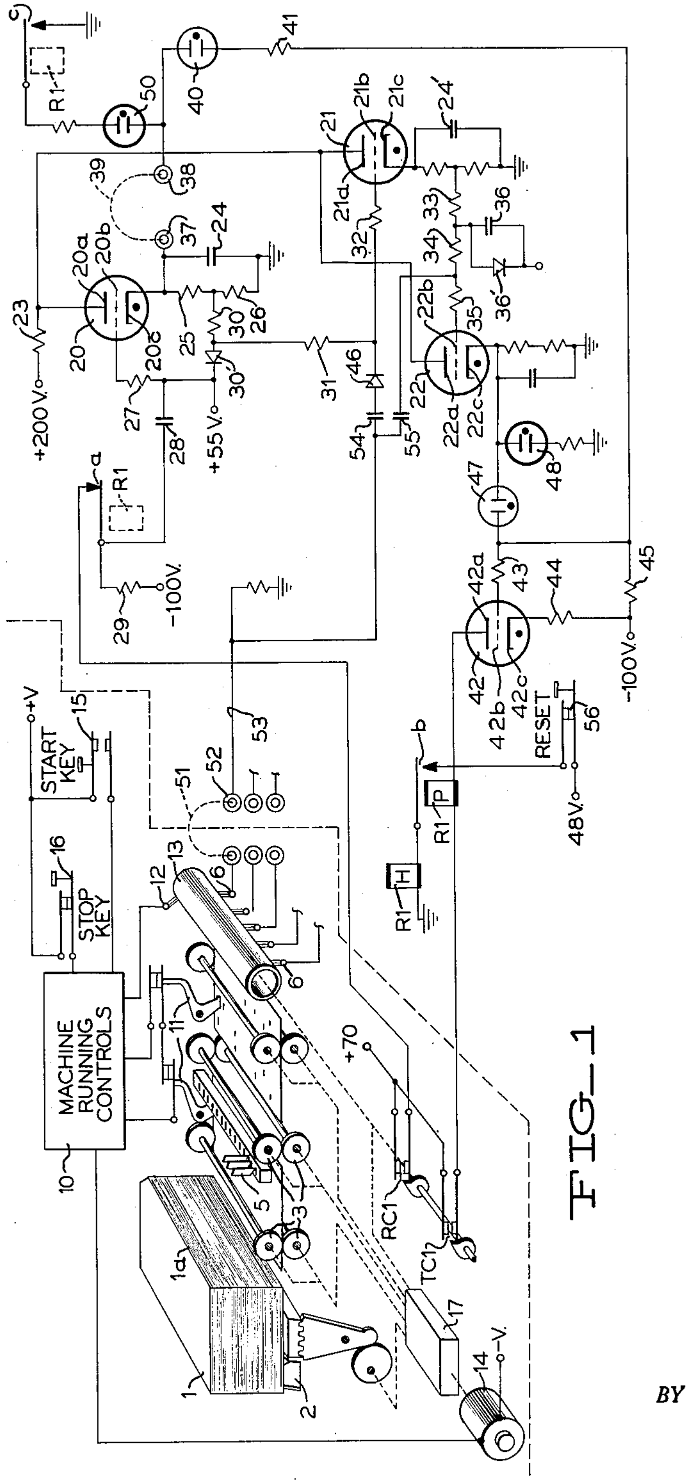
FIG. 1 shows the circuit arrangement, constituting the invention, incorporated in a portion of a well-known card controlled machine.

Referring to the left side of FIG. 1, there is shown diagrammatically the punch unit which has a stack of records 1 supported in a hopper not shown. A conventional picker knife arrangement 2 is used to feed the records singly to appropriate sets of feed rolls 3 disposed along the path of card travel in the machine. These feed rolls convey the records in succession through a punching station, a reading, or checking station, and finally into a card receiving stacker, not shown. The punching station is diagrammatically shown as having a single row of punches 5 cooperating with a die, not shown, disposed beneath the path of travel of the cards. The punches are driven by means, not shown, to perforate the records in accordance with data fed into a punch control setup means, not shown. In the normal course of operation of the machine, this data is usually sensed from the perforated records passing through the read unit of the reproducing machine.

The reading, or checking, station comprises a line of eighty sensing brushes 6 of which only a few are shown. These brushes terminate in plug sockets to which plug wires are connected, the opposite ends of which are connected to plug sockets forming inputs to the circuit means constituting a part of the invention.

As further seen in FIG. 1, the punch unit is provided with machine running controls 10, in block form, connected to card lever contacts operated upon by the well-known card levers 11 in turn disposed to cooperate with the records passing through the machine. These machine running control circuits includes circuits of a preparatory nature which control the machine during run-in and run-out operations. At appropriate times in each machine cycle a common brush 12 cooperating with the contact roll 13 energizes the latter so as to enable timed impulses to be provided at the sensing brush sockets 7 in response to the sensing of perforations encountered by the sensing brushes 6.

The machine is driven by a drive motor 14 whose control circuits are influenced by the machine running control circuits. Appropriate start 15 and stop keys 16 are provided to initiate and stop operations of the machine. The necessary clutch means, controls therefor and cam contacts are housed in a box referenced as 17.

Figure 2:
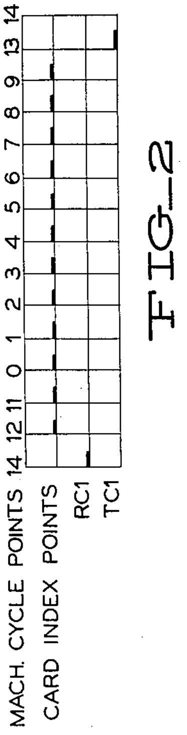
FIG. 2 is an electrical time chart.

Reset cam contacts RC1, and test cam contacts TC1, driven by means schematically shown, are used for reset and test functions, respectively, in a manner to be described, during the portions of the cycle indicated in the time chart of FIG. 2.

As earlier mentioned, the invention includes a three-stage open-ended ring in combination with circuit means, which includes, among other things, relatively inexpensive neon type diodes for manifesting the status of a record column, or columns, depending upon the number of columnar positions analyzed, as to the absence of data designations, or the presence of unwanted designations in columns where valid data designations are recorded. The three-stage ring includes three cold cathode type 5823 tubes, namely, 20 for stage 1, 21 for stage 2 and 22 for stage 3. Each tube comprises an envelope containing an ionizable gas, a plate, a control grid and a cathode. These elements bear both numerical and alphabetical indications so as to relate the elements to their respective stages, for example, in stage 1, tube 20, the associated plate, grid and cathode elements are referenced as 20*a*, 20*b* and 20*c*, respectively. The plates of the tubes are each connected to associated circuits terminating at a common supply of 200 volts in which there is also included a 1 watt 2200 ohm resistor 23. The cathodes are each connected to an associated RC network terminating at a ground connection. Each cathode RC network includes components of the same value, for example, in stage 1 the cathode RC network comprises a .25 mfd. capacitor 24, a 5100 ohm 2 watt resistor 25 and an 8200 ohm 2 watt resistor 26. The grid 20*b* of first stage tube 20 is connected to a circuit which includes a 3900 ohm resistor 27, a .0068 mfd. capacitor 28 and a 10,000 ohm resistor 29 connected to a negative supply of 100 volts. The grid 20*b* also has a connection to a positive bias supply of plus 55 volts. A reset circuit is also connected to the above circuit and is controlled by cam contacts RC1, in turn connected to a positive supply of plus 70 volts. Included in this circuit are contacts R1*a*, normally closed, associated with a reset relay R1, the purpose of which will be described later on in this description.

The cathode circuits of tubes 20 and 21 are further conditioned by crystal-type diodes, namely, 30' and 36'. These diodes are employed to clip the voltages at the cathode center taps at 55 volts, otherwise the wide variations in the voltages existing in the circuitry would erroneously cause a tube to fire. Coupling between the first and second stages comprises a circuit which extends from the cathode RC network of tube 20 to the grid 21*b* of tube 2 and includes 100,000 ohm resistors 30, 31 and 32. Coupling between stages 2 and 3 is quite similar and comprises a path which includes a 33,000 ohm resistor 33 and 100,000 ohm resistors 34 and 35. In addition, a .02 mfd. capacitor 36 is connected across the diode 36' for the purpose of slowing down the conditioning of grid 22*b* of tube 22. This is accomplished by virtue of the fact that the capacitor bypasses transients which may occur during the sensing of the designations in the record columns. The first stage, employed to indicate a blank column condition, has a cathode output socket 37 connected to another socket 38 by way of plug wire 39 forming part of a circuit having a neon indicating diode 40, resistors 41 and 43, the latter in turn being connected to a grid 42*b* forming part of an error control tube 42. The latter is also of the cold cathode gas tube type having in addition a plate 42*a* and a cathode 42*c*. The tube 42 is connected to a negative 100 volt supply by way of a path which includes a resistor 44. The negative 100 volt supply further influences the grid 42*b* by way of resistor 45. Also this influence is applied to the neon diode 40 by way of resistor 41. The plate 42*a* is connected to a plus 70 volt supply by way of a circuit path controlled by cam contact TC1. Included in this path is the pickup coil of the control relay R1. A hold coil for the relay R1 is shown immediately above and includes R1*b* normally open contacts, and a normally closed reset key contact 56 in turn connected to a plus 48 volt supply.

Stage 2, tube 21, when turned on during an operating cycle indicates the presence of a single, or valid, designation in the column being scanned.

Stage 3, tube 22, is employed, when on, to manifest more than one designation in a column, i.e., the presence of an unwanted designation. A neon diode tube 47 is used merely as a current passing device which becomes effective whenever the voltage thereacross is of sufficient magnitude. Neon diodes 48 and 50, respectively, are used to display the presence of a blank column and the presence of unwanted designations. The blank column indicating diode 50 is included in a circuit further conditioned by normally open R1*c* contact points associated with the relay R1. The circuit for passing signals, each indicative of a sensed designation in a specified column, extends from the sensing brush socket, through plug wire 51, double punch and blank column entry socket 52, line 53 which branches off into two paths each including a capacitor, namely, 54 and 55, the former supplying the signals to the grid 21*b* of stage 2 and the latter supplying the grid 22*b* of stage 3.

The above circuit arrangement describes the apparatus required to accommodate a single column or region of a record medium. For each additional column to be analyzed, it will be necessary to duplicate the above apparatus except for the tube 42, the latter being shared by as many additional circuits as is needed.

In operation, at the beginning of a cycle, reset cam contacts RC1 close to supply a positive 70 volt signal through capacitor 28 to energize grid 20*b* of stage 1. This signal is of sufficient magnitude to initiate conduction in the tube 20, stage 1. The voltage on plate 20*a* is dropped from 200 volts to approximately 80 volts during the initial ionization period and settles to approximately 185 volts during steady state conduction as the capacitor 24 is fully charged.

The cathode 20*c*, during initial ionization, is at ground potential and then settles to approximately 105 volts when the capacitor 24 is fully charged. Thus at the completion of a reset operation the first stage is on and stages 2 and 3 are both off.

With the cathode at approximately 105 volts, the voltage on grid 21*b* will be of a magnitude insufficient to fire tube 21.

Grid 22*b* of tube 22 is at ground potential at this time. The foregoing explains the reset operation at the beginning of a cycle.

The following explains operations contingent upon the sensing, by the sensing brush, of a designation, i.e., a hole in the card. When such a hole is encountered, a plus 70 volt shift is applied by way of line 53 through capacitors 54 and 55 to their associated grids 21*b* and 22*b*, respectively, associated with stages 2 and 3. This 70 volt pulse is added on to the voltage previously applied to grid 21*b* and is therefore sufficient to ionize the tube 21. During the initial ionization, the plate voltage being at 185 volts, suddenly drops to approximately plus 80 volts. This drop in voltage is accounted for by the fact that the tube drop of the type 5283 is approximately 80 volts and the fact that at the instant of ionization the cathode is at ground potential. The sudden drop in plate voltage terminates conduction in tube 20 of stage 1.

As the capacitor 24' in the cathode RC circuit of tube 21 charges, the voltage on the anode 21*a* of tube 21 builds up to approximately 185 volts as the voltage on the cathode 21*c* builds up to approximately 105 volts, this being sufficient to sustain conduction in tube 21.

When a second or unwanted hole is encountered during the same cycle of operation, another 70 volt signal is again applied to both grids 21*b* and 22*b* in the manner previously explained to cause tube 21, stage 2, to be extinguished and tube 22, stage 3, to be set into conduction. At near the end of the card sensing portion of the cycle and regardless of how many additional unwanted holes were encountered, the tube 22, stage 3, will be in conduction while stages 1 and 2 will be in nonconduction. With this condition, it will be noted that grid 42*b* of the control tube 42 will be energized in response to the 105 volts appearing on the cathode 22*c* of tube 22.

At test time of the cycle when cam contacts TC1 make the control tube 42 is set into conduction, and in consequence thereof, the pick coil of the relay R1 is energized. Concurrently, neon indicating diode 48 will glow to indicate a double designation or, in other words, the fact that there is present at least one unwanted hole or designation.

In a blank column detection operation, at the start of the cycle, stage 1 is reset to conduction while stages 2 and 3 are turned off, this operation being the same as previously described. The fact that no holes are encountered in this operation, no signals are supplied to energize grids 21*b* and 22*b* associated with stages 2 and 3. At the end of card sensing time, cathode 20*c* will be at a 105 volts potential, to energize grid 42*b* of the control tube 42. At test time when cam contacts TC1 make, tube 42 fires and energizes the relay R1 as before. Accordingly, the contacts R1*c* close to cause a circuit to the indicating diode 50, the latter upon glowing serves as an indication or a manifestation of a blank column.

When during the course of an operation a single hole is encountered, the signal issued in consequence thereof is applied to both grids 21*b* and 22*b* to cause tube 21 to fire and tube 20 to be extinguished. At the end of this cycle of operation, the control tube 42 will not be fired at the time TC1 closes.

If for some fault a spurious signal occurs, during brush reading time, the condition may be interpreted as two signals which could cause stage 2 to go on while turning stage 1 off during the period that the spurious signal is effective and thereafter causing stage 3 to go on and stage 2 to go off during the remaining portion of the brush sensing interval when the 70 volt signal is effective. The capacitor 36 in this instance would prevent the spurious signal from energizing the grid **22*b* of tube 3** by virtue of the fact that the cathode signal would be integrated by means of the capacitor. The value of capacitance will, of course, vary, depending upon the time constant required and the duration of the brush time signal.

Diode 46 is included in the starter electrode circuit to prevent firing of tube 21 by the trailing edge of the second input signal.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for detecting blanks or unwanted designations in columns of a record, each column having spaced index positions in which a valid character is manifested by the presence of a designation in but one of the index positions thereof comprising: index sensing means for sensing the index positions for designations; a three-stage open-ended ring, each stage including a thyratron having a plate connected to an appropriate supply voltage, a control grid, and a cathode, and interstage coupling means, including other appropriate supply voltages, connecting the cathode of one stage with the control grid of the next succeeding stage whereby the latter is conditioned when the previous stage is in conduction and whereby a preceding stage is extinguished when the next succeeding stage is set into conduction; means for setting the first stage into conduction prior to the beginning of a sensing operation; input means connected to said index sensing means and coupled to the control grids of stages 2 and 3 and effective in response to the first sensed designation to set the second stage on and the first stage off and thereafter in response to the first unwanted designation to set the third stage on and the second stage off; and gas type diode means responsive to the first and third stages to manifest a blank column or the presence of an unwanted designation depending upon whether the first or third stage is on.

2. Apparatus as in claim 1 further characterized by the provision of an RC network included in the interstage coupling between stages 2 and 3 for suppressing transients during the sensing of the first designation.

3. Apparatus as in claim 2 further characterized by the provision of clipping diodes included in the cathode means of the first stage and the third stage to prevent conditioning operations from erroneously setting a stage into conduction.

References Cited in the file of this patent

UNITED STATES PATENTS

| | | |
|---|---|---|
| 2,275,396 | Johnson | Mar. 3, 1942 |
| 2,598,764 | Desch et al. | June 3, 1952 |
| 2,607,015 | Townsend | Aug. 12, 1952 |
| 2,614,632 | Clos | Oct. 21, 1952 |
| 2,646,926 | Young et al. | July 28, 1953 |
| 2,758,250 | Ridler et al. | Aug. 7, 1956 |
| 2,861,216 | England | Nov. 18, 1958 |
| 2,869,035 | Beesley | Jan. 13, 1959 |

OTHER REFERENCES

Flood et al.: "The Design of Cold-Cathode Valve Circuits," Electronic Engineering, November 1956, pp. 491–493. (Copy in Div. 92.)

Threadgold: "Analysis of A Cold-Cathode Delay Circuit," A.T.E. Journal, July 1953, pp. 176–180. (Copy in Scientific Library.)